United States Patent Office 3,210,412
Patented Oct. 5, 1965

3,210,412
m-(ALKANAMIDOALKANAMIDO)-2,4,6-TRI-
IODOBENZOIC ACID COMPOUNDS
Douglas W. Chapman, Greendale, Mo., assignor to Mallinckrodt Chemical Works, St. Louis, Mo., a corporation of Missouri
No Drawing. Filed Feb. 6, 1962, Ser. No. 171,352
6 Claims. (Cl. 260—518)

This application is a continuation-in-part of my copending application, Serial No. 74,221, filed December 7, 1960, now abandoned.

This invention relates to benzoic acid derivatives and more particularly to certain triiodobenzoic acid derivatives.

Briefly, the present invention is directed to certain novel meta-(alkanamidoalkanamido)-2,4,6-triiodobenzoic acids and their pharmaceutically acceptable salts. The invention also includes methods of preparing compounds of the class mentioned, as well as certain novel intermediates used in their preparation.

Among the objects of the invention may be mentioned the provision of new benzoic acid derivatives; the provision of new meta-(alkanamidoalkanamido)-2,4,6-triiodobenzoic acid compounds; the provision of compounds of the type indicated which are useful for the preparation of roentgenographic contrast media; the provision of new intermediates useful in the preparation of such compounds; and the provision of methods of preparing such compounds. Other objects will be in part apparent and in part pointed out hereinafter.

The invention accordingly comprises the products and methods hereinafter described, the scope of the invention being indicated in the following claims.

The present invention is directed to the novel triiodobenzoic acid derivatives represented by the formula:

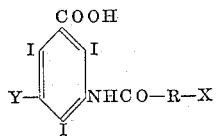

where R is a lower alkylene group, X is a halo, amino or lower alkanamido function, and Y is a function known to be compatible with low toxicity and high water solubility in the 2,4,6-triiodobenzoic acid configuration; and their pharmaceutically acceptable salts. The invention also includes methods of preparing the compounds defined above.

The following examples will clarify the meaning of the general terms referred to above. As examples of lower alkylene groups, the following may be cited: —CH$_2$—, —CH$_2$—CH$_2$—,

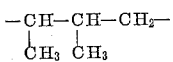

As examples of lower alkanamido functions there may be mentioned the formamido, acetamido and propionamido functions. As examples of pharmaceutically acceptable salts there may be mentioned, in particular, sodium, N-methylglucamine and diethanolamine salts.

As defined above, the functions attached at Y are functions known to be compatible with low toxicity and high water solubility in the 2,4,6-triiodobenzoic acid configuration. In this context, the characteristic of high water solubility is to be thought of primarily as a characteristic of the pharmaceutically acceptable salts rather than of the acids per se. As examples of such functions there may be mentioned hydrogen and the carboxyl, lower alkanamido, lower alkylsulfonamido, ureido, 3-lower alkylureido, 3,3-bis-(lower alkyl) ureido, lower alkoxy, 2,3-dihydroxypropoxy, carbamyl, N-(lower alkyl)carbamyl, N,N-di-(lower alkyl)carbamyl and N-(carboxymethyl)carbamyl groups.

Other examples within the classes mentioned will readily occur to those skilled in the art.

The novel compounds of the invention may be made by a new combination of synthetic steps, although each step is of a type previously known. The first step is the acylation of a meta-amino-2,4,6-triiodobenzoic acid of the general formula:

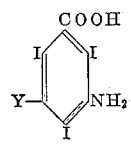

where Y has the meaning described previously. This meta-amino-2,4,6-triiodobenzoic acid is treated with a haloacyl halide to form a meta-haloalkanamido-2,4,6-triiodobenzoic acid. As the acylating agent in this step a chloroacyl chloride, such as chloroacetyl chloride, is usually preferred for reasons of cost and availability, although other haloacyl halides, such as iodoacetyl chloride or chloropropionyl bromide, may be used.

The acylation is carried out in a suitable inert solvent. The solvent should be capable of dissolving a significant proportion of the aminotriiodobenzoic acid starting material and should be inert toward the haloacyl halide used. Ethylene dichloride, N,N-dimethylacetamide, dioxane and mixtures of chloroform and N,N-dimethylformamide have been used successfully.

Yields are often improved and the evolution of corrosive HCl reduced or prevented by including in the reaction mixture a neutral HCl acceptor, such as pinene.

The meta-(haloalkanamido)-2,4,6-triiodobenzoic acid formed in the reaction outlined above is isolated and then subjected to ammonolysis. This may be accomplished in the usual manner by dissolving the acid an a large excess of ammonium hydroxide solution and allowing the solution to stand for an extended period. Several days may be required at room temperature, but the reaction rate may be accelerated by heating the mixture in a pressure vessel.

The meta-(aminoalkanamido)-2,4,6-triiodobenzoic acid resulting from the ammonolysis reaction described above is isolated and then subjected to a second acylation step. The acylation may be accomplished in aqueous solution using an appropriate acid anhydride as the acylating agent. The aminoalkanamidotriiodobenzoic acid is brought into solution with sufficient base to make the solution slightly alkaline. A pH of about 10–11 is normally satisfactory. Too alkaline a solution results in excessive loss of acylating agent by hydrolysis. The meta-(alkanamidoalkanamido)-2,4,6-triiodobenzoic acid is precipitated by acidifying the reaction solution and is purified, if necessary, by conventional methods.

The meta-(alkanamidoalkanamido)-2,4,6-triiodobenzoic acids of the present invention are useful for the preparation of roentgenographic contrast media. For example, concentrated sterile aqueous solutions of the salts of these acids with non-toxic cations are of low toxicity and contain a high concentration of organically bound and substantially physiologically inert iodine which can be administered intravascularly. The lower members of the series are excreted primarily by way of the urinary system. The methylglucamine salt and, in many cases, the sodium salt are particularly useful for the preparation of solutions for intravascular injection in connection with vasographic techniques, such as angiocardiograph, arteriography, and venography. Such solutions are also useful in techniques for visualizing structures of the excretory system. Solutions in pharmaceutically acceptable solvents other than water are also useful for special purposes.

Dispersions of water-insoluble derivatives of these acids, such as their esters, are also useful, as for example, in visualizing hollow organs and cavities having external orifices through which the contrast preparation can be introduced in preparation for the examination and removed after the examination is completed.

The compounds are also useful for the preparation of other types of contrast media such as for example, non-aqueous dispersions.

As is evident from the preceding description of the synthetic processes used in preparing the alkanamidoalkanamido compounds of the invention, the meta-(haloalkanamido)-2,4,6-triiodobenzoic acids and the meta-(aminoalkanamido)-2,4,6-triiodobenzoic acids are useful intermediates for the preparation of the meta-(alkanamidoalkanamido)-2,4,6-triiodobenzoic acids and other useful compounds.

The meta - (aminoalkanamido)-2,4,6-triiodobenzoic acids have, in addition to their utility as intermediates, utility as X-ray contrast agents. These compounds exist as zwitter-ions, due to their containing both a basic amino group and an acidic carboxyl group in the same molecule.

The following examples illustrate the invention.

EXAMPLE 1

*3-chloroacetamido-2,4,6-triiodobenzoic acid*

Chloroacetyl chloride (120 ml., 1.59 moles) was added during 1 hour to a stirred, refluxing slurry of 3-amino-2,4,6-triiodobenzoic acid monohydrate (213 g., 0.4 mole), ethylene dichloride (400 ml.) and pinene (120 ml., 0.77 mole). After an additional hour under reflux, the reaction mixture was chilled and the crude product collected and washed with chloroform (115 ml.). The crude product was purified by acidifying an aqueous solution of the sodium salt. Yield of 3-chloroacetamido-2,4,6-triiodobenzoic acid, 199 g. (84.3% of theory). M.P. 258–260° C. (corrected).

EXAMPLE 2

*3-aminoacetamido-2,4,6-triiodobenzoic acid*

3-chloroacetamido-2,4,6-triiodobenzoic acid (199 g., 0.34 mole) was dissolved in 3 liters of 27% ammonia solution. After standing 4 days in a stoppered flask at room temperature, the solution was concentrated to a volume of one liter, acidified to pH 5–6 with acetic acid, and chilled. The crude product was collected, washed with water and dried. Dissolution of the crude product as the sodium salt and reprecipitation by acidifying the solution with acetic acid yielded 170 g. of partially purified 3-aminoacetamido-2,4,6-triiodobenzoic acid. A portion of this product was treated further by conventional methods of purification to yield purified 3-aminoacetamido-2,4,6-triiodobenzoic acid monohydrate. Melting point, 245° C. (corrected) with decomposition. Calculated for $C_9H_7N_2O_3I_3 \cdot H_2O$: Neutral equivalent, 590; I, 64.7%; $H_2O$, 3.1%. Found: Neutral equivalent, 595; I, 63.3%; $H_2O$, 3.0%.

EXAMPLE 3

*3-aceturamido-2,4,6-triiodobenzoic acid*

Partially purified 3-aminoacetamido-2,4,6,-triiodobenzoic acid (142.5 g.), prepared as described in Example 2, was slurried in water (500 ml.), and sufficient 50% sodium hydroxide solution was added to yield a solution of pH 10–11. Acetic anhydride (40 ml.) was added with vigorous stirring. The solution was stirred for an addition 10 minutes, then treated twice with decolorizing charcoal and acidified to Congo red by the addition of concentrated hydrochloric acid. The mixture was chilled and the crude thixotropic product was collected and dried at 115° C. Yield, 135 g. (neutral equivalent, 628). The crude product was purified by dissolving it as the sodium salt and reprecipitating it by acidifying the solution. This treatment was repeated. Yield of 3-aceturamido-2,4,6-triiodobenzoic acid, 88 g. Melting point, 235.8–236.8° C. (corrected) with decomposition. Calculated for $C_{11}H_9N_2O_4I_3$: Neutral equivalent 614.0; I, 62.0%. Found: Neutral equivalent, 616; I, 61.5%.

EXAMPLE 4

*3-aceturamido-2,4,6-triiodobenzoic acid, sodium salt*

The sodium salt of 3-aceturamido-2,4,6-triiodobenzoic acid was prepared by conventional means. Its solubility in water is approximately 36% (w./v.) at 25° C.

A 50% solution (supersaturated) of this salt, containing 300 mg. I/ml. was prepared and sterilized. By intravenous administration of this solution to albino mice, the acute $LD_{50}$ of the sodium salt was found to be approximately 14,000 mg. per kg. When tested by a modification of the technique described in Whiteleather and De Saussure (Radiology 67: 537–43, October 1956), the local tissue toxicity of 3-aceturamido-2,4,6-triiodobenzoic acid, sodium salt, as indicated by damage to the blood-brain barrier of the dog, compared favorably with that of sodium diatrizoate (sodium 3,5-bis-acetamido-2,4,6-triiodobenzoate). In other respects, the sodium salt of 3-aceturamido-2,4,6-triiodobenzoic acid showed somewhat more pharmacological activity in laboratory animals than did sodium diatrizoate.

EXAMPLE 5

*3-aceturamido-2,4,6-triiodobenzoic acid, N-methylglucamine salt*

The N-methylglucamine salt of 3-aceturamido-2,4,6-triiodobenzoic acid was prepared by conventional means. It is highly soluble in water.

A solution suitable for intravascular administration having the following characteristics was prepared:

64% (w./v.) dissolved solids
pH, 7.4
300 mg. I/ml.

EXAMPLE 6

*5-chloroacetamido-2,4,6-triiodoisophthalic acid (5-carboxy-3-chloroacetamido-2,4,6-triiodobenzoic acid)*

Chloroacetyl chloride (225 ml., 3 moles) was added to a hot, stirred solution of 5-amino-2,4,6-triiodoisophthalic acid (559 g., 1 mole) in dioxane (700 ml.) and pinene (465 ml., 3 moles) at a rate sufficient to maintain gentle reflux. The addition of the chloroacetyl chloride required 1½ hours, after which the reaction mixture was refluxed for an additional 40 minutes. At the end of this time a large amount of product had separated. The mixture was chilled and the product collected and washed with dioxane (500 ml.). The weight of the dry crude product was 524 g.

A portion (171.5 g.) of this crude product was dissolved in water (800 ml.) containing sufficient sodium hydroxide to complete solution. Concentrated ammonia solution (20 ml.) was added and the solution was heated at 60–70° C. for 15 minutes. The solution was then acidified to pH 5, treated with decolorizing charcoal and filtered. The filtrate was slowly added to a stirred solution of hydrochloric acid (85 ml. concentrated acid diluted with 200 ml. water). The mixture was chilled and the purified 5-chloroacetamido-2,4,6-triiodoisophthalic acid collected and dried at 120° C. Yield, 133 g. (64%). When heated to 370° C. the product evolved iodine vapors but did not melt. Calculated for $C_{10}H_5NO_5ClI_3$: Neutral equivalent, 318. Found: Neutral equivalent, 318.

EXAMPLE 7

*5-aminoacetamido-2,4,6-triiodoisophthalic acid (3-aminoacetamido-5-carboxy-2,4,6-triiodobenzoic acid)*

5-chloroacetamido-2,4,6-triiodoisophthalic acid (175 g.) was dissolved in 27% ammonia solution (2650 ml.)

in each of two flasks, which were then stoppered and set aside for four days at room temperature. The solutions were then combined, concentrated to about 2.5 liters, acidified to Congo red with concentrated hydrochloric acid and chilled. The collected precipitate was redissolved in water (1300 ml.) plus sufficient sodium hydroxide to complete solution. The pH was adjusted to approximately 5 with hydrochloric acid and the hot solution was treated twice with decolorizing charcoal and filtered. The solution, which still contained some color, was slowly added to a hot, stirred solution of hydrochloric acid (132 ml. concentrated acid diluted with 264 ml. water). The resulting slurry was chilled and the product collected, washed with water and dried at 120° C. Yield, 253 g.

A portion (128 g.) of the above preparation was further purified by twice precipitating the acid from a solution of the sodium salt. Yield of 5-aminoacetamido-2,4,6-triiodoisophthalic acid, 106 g. (62%). Calculated for $C_{10}H_7N_2O_5I_3$: Neutral equivalent, 308. Found: Neutral equivalent, 300.

The above preparation was repeated, with a 66% yield of material of neutral equivalent 306, melting with decomposition at 288.3° C. (corrected).

5-aminoacetamido-2,4,6-triiodoisophthalic acid was dissolved in water containing sufficient sodium hydroxide to yield a solution of pH 7, containing 300 mg. I/ml. This solution contained 51% (w./v.) total solids, and the molar ratio of sodium to 5-aminoacetamido-2,4,6-triiodoisophthalic acid was 1.35. Methylparaben (0.1%) was added as a preservative, and the solution was pasteurized. The acute intravenous $LD_{50}$ of this salt in mice was found to be approximately 8,220 mg./kg. Its solubility at 25° C. is approximately 89% (w./v.).

EXAMPLE 8

*5-aceturamido-2,4,6-triiodoisophthalic acid (3-aceturamido-5-carboxy-2,4,6-triiodobenzoic acid)*

Sufficient 50% sodium hydroxide solution was added to a suspension of 5-aminoacetamido-2,4,6-triiodoisophthalic acid (50.5 g.) in water (150 ml.) to yield a solution of pH 10–11. To this vigorously stirred solution was added acetic anhydride (10 ml.).

After completion of the acetylation, the product was separated and purified by treating a solution of the sodium salt (pH 5) with decolorizing charcoal and then acidifying the solution to Congo red by the addition of concentrated hydrochloric acid, to precipitate the free acid. This treatment was repeated. Yield of 5-aceturamido-2,4,6-triiodoisophthalic acid, 31.7 g. (58%). The product melts with decomposition at 261.5° C. (corrected). Calculated for $C_{12}H_9N_2O_6I_3$: Neutral equivalent, 329; I, 57.9%. Found: Neutral equivalent, 325; I, 56.6%.

EXAMPLE 9

*5-aceturamido-2,4,6-triiodoisophthalic acid, disodium salt*

The disodium salt of 5-aceturamido-2,4,6-triiodoisophthalic acid was prepared from the acid by conventional means. Its solubility (pH 7) is approximately 103 g. per 100 ml. of solution.

A 55% (w./v.) solution of this salt containing 300 mg. I/ml. was prepared. Methylparaben (0.1%) was added as a preservative, and the solution was pasteurized. By intravenous injection of this solution into albino mice, the acute $LD_{50}$ of the salt was found to be approximately 13,300 mg./kg.

EXAMPLE 10

*3-chloroacetamido-5-methylsulfonamido-2,4,6-triiodobenzoic acid*

3-Amino-5-methylsulfonamido - 2,4,6 - triiodobenzoic acid was prepared by the method described in the copending, coassigned application, Serial No. 746,072 of De La Mater and Wiegert, filed July 2, 1958, now Patent No. 3,036,063. In this synthesis a dioxane solution of 5-amino-3-nitrobenzoic acid containing a small amount of pyridine is treated with methanesulfonyl chloride to form 5-methylsulfonamido-3-nitrobenzoic acid. The nitro group is reduced by catalytic hydrogenation and the resulting 3-amino-5-methylsulfonamidobenzoic acid is exhaustively iodinated in acid solution by means of iodine monochloride.

The resulting 3-amino-5-methylsulfonamido-2,4,6-triiodobenzoic acid (62 g., 0.1 mole by N.E.) was dissolved in dioxane (70 ml.) and pinene (46.5 ml., 0.3 mole). The solution was stirred and heated to gentle reflux, and chloroacetyl chloride (22.4 ml., 0.3 mole) was added during 5 minutes. Heating and stirring was continued for ½ hour, after which the reaction mixture was chilled and the product was collected and washed with dioxane (50 ml.). The near white product was dissolved in water (250 ml.) plus sufficient sodium hydroxide to complete solution. The cold solution at pH 5 was treated with decolorizing charcoal and filtered. The filtrate was heated and acidified to Congo red with concentrated hydrochloric acid, yielding 47 g. of crude 3-chloroacetamido-5 - methylsulfonamido - 2,4,6 - triiodobenzoic acid. The product did not melt at temperatures up to 370° C.

EXAMPLE 11

*3-aminoacetamido-5-methylsulfonamido-2,4,6-triiodobenzoic acid*

Crude 3-chloroacetamido-5-methylsulfonamido - 2,4,6-triiodobenzoic acid (45.5 g.) was dissolved in a 27% ammonia solution (650 ml.). The solution was kept in a stoppered flask four days at room temperature, after which it was concentrated to 300 ml. The hot solution was acidified to pH 6 with acetic acid and chilled, and the crude 3-aminoacetamido-5-methylsulfonamido-2,4,6-triiodobenzoic acid collected. Yield, 40 g. Decomposes 249–250° C. (corrected). Calculated for $C_{10}H_{10}N_3O_5SI_3$: Neutral equivalent, 665. Found: Neutral equivalent, 695.

EXAMPLE 12

*3-aceturamido-5-methylsulfonamido-2,4,6-triiodobenzoic acid*

Crude 3-aminoacetamido-5-methylsulfonamido-2,4,6-triiodobenzoic acid (36.5 g.) was slurried in water (100 ml.), and sufficient 50% sodium hydroxide solution was added to give a solution of pH 10. Acetic anhydride (10 ml. was added with vigorous stirring. After 15 minutes the reaction mixture was acidified to Congo red with concentrated hydrochloric acid, then chilled and the product collected. The crude product was redissolved as the sodium salt and the solution was acidified to reprecipitate 3-aceturamido-5-methylsulfonamido-2,4,6 - triiodobenzoic acid. Yield, 32.5 g. Melting point, 202.2–203.7° C. (corrected), with decomposition. Calculated for

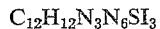

Neutral equivalent, 707; I, 53.9%. Found: Neutral equivalent (uncorrected), 732; corrected for water and sodium, 697; iodine, 52.4% (corrected).

EXAMPLE 13

*3-aceturamido-5-methylsulfonamido-2,4,6-triiodobenzoic acid, sodium salt*

The sodium salt of 3-aceturamido-5-methylsulfonamido-2,4,6-triiodobenzoic acid was prepared from the free acid by conventional means. The solubility of the sodium salt is approximately 51.7% (w./v.).

EXAMPLE 14

*3-aceturamido-5-methylsulfonamido-2,4,6-triiodobenzoic acid, N-methylglucamine salt*

3-Aceturamido - 5 - methylsulfonamido - 2,4,6 - triiodobenzoic acid was dissolved in water containing sufficient N-methylglucamine to form a solution of pH 7 containing 300 mg. I/ml. The molar ratio of N-methylglucamine to 3-aceturamido-5-methylsulfonamido-2,4,6-triiodobenzoic acid was 1.24. The solution contained 75% (w./v.) total solids. Methylparaben (0.1%) was added as a preservative and the solution was pasteurized. The acute intravenous $LD_{50}$ in mice, calculated on a dissolved solids basis, is approximately 15,000 mg./kg.

EXAMPLE 15

*3-acetamido-5-chloroacetamido-2,4,6-triiodobenzoic acid*

Chloroform (200 ml.) and dimethylformamide (100 ml.) were added in that order to 3-acetamido-5-amino-2,4,6-triiodobenzoic acid (114 g., 0.2 mole). To this stirred suspension, chloroacetyl chloride (53 ml., 0.7 mole) was added during 5 minutes. The temperature rose to 50° C. during the addition, and there was some indication that the acid partially dissolved. The mixture was stirred for 1 hour, heated to 60° C. and poured into hot water (400 ml.). The chloroform was boiled off and sodium hydroxide solution added to dissolve the product. The acidity was adjusted to pH 6 and the solution treated with decolorizing charcoal. The filtrate from the charcoal treatment was added slowly to a hot stirred solution of hydrochloric acid (30 ml. of concentrated acid diluted with 150 ml. of water). The mixture was chilled to 10° C. and the crude 3-acetamido-5-chloroacetamido-2,4,6-triiodobenzoic acid collected, washed and dried. Yield, 82 g. Calculated for $C_{11}H_8N_2O_4ClI_3$: Neutral equivalent, 648. Found: Neutral equivalent, 629. The product was used in the next step without further purification.

EXAMPLE 16

*3-acetamido-5-aminoacetamido-2,4,6-triiodobenzoic acid*

Crude 3 - acetamido - 5 - chloroacetamido - 2,4,6 - triiodobenzoic acid (81.5 g.) was dissolved in a 27% ammonia solution (1300 ml.), and the solution was allowed to stand at room temperature for four days in a stoppered flask. The solution was then concentrated to 300 ml., acidified to pH 5 with acetic acid and chilled. The white 3-acetamido-5-aminoacetamido-2,4,6-triiodobenzoic acid was collected and dried at 120° C. Yield, 48 g. It was used in the next step without further purification.

EXAMPLE 17

*3-acetamido-5-aceturamido-2,4,6-triiodobenzoic acid*

3 - Acetamido - 5 - aminoacetamido - 2,4,6 - triiodobenzoic acid (48 g.) was slurried in water (200 ml.) and sufficient sodium hydroxide solution was added to give a solution of pH 10–11. Acetic anhydride (20 ml.) was added to the well stirred solution, and after ½ hour the solution was treated with decolorizing charcoal and filtered. The filtrate was added dropwise to a stirred solution of hydrochloric acid (10 ml. concentrated acid diluted with 100 ml. water) at room temperature. The amorphous precipitate crystallized overnight. It was combined with 10 g. of a similar preparation and the hydrochloric acid treatment repeated. Again the product was initially amorphous, but it crystallized during 5 hours stirring at room temperature. The 3-acetamido-5-aceturamido-2,4,6-triiodobenzoic acid was collected, washed and dried at 110–120° C. Yield, 42 g. Melting point, 228.2–230.2° C. (corrected) with decomposition. Calculated for $C_{13}H_{12}N_2O_5I_3$: Neutral equivalent, 671; I, 56.7%; N, 6.25%. Found: Neutral equivalent, 674; I, 56.6%; N, 6.09%.

EXAMPLE 18

*3-acetamido-5-aceturamido-2,4,6-triiodobenzoic acid, N-methylglucamine salt*

The N-methylglucamine salt of 3-acetamido-5-aceturamido-2,4,6-triiodobenzoic acid was prepared by conventional means. A 68% (w./v.) solution containing 300 mg. I/ml. was prepared. Methyl paraben (0.1%) was added as a preservative, and the solution was pasteurized. Using this solution, the intravenous acute $LD_{50}$ of the salt in albino mice was found to be approximately 14,800 mg./kg.

EXAMPLE 19

*3-acetamido-5-aceturamido-2,4,6-triiodobenzoic acid, sodium salt*

The sodium salt of 3-acetamido-5-aceturamido-2,4,6-triiodobenzoic acid was prepared from the free acid by conventional means. Its solubility in water at 25° C. is approximately 68% (w./v.).

A 55% solution of this salt, containing 300 mg. I/ml., was prepared and sterilized. When tested by a modification of the technique described by Whiteleather and De Saussure (Radiology 67: 537–43, October 1956), the local tissue toxicity of this salt, as indicated by damage to the blood-brain barrier of the dog, compared favorably with that of sodium diatrizoate.

EXAMPLE 20

*5-choloracetamido-2,4,6-triiodo-N-methylisophthalamic acid*

5-amino-2,4,6-triiodo-N-methylisophthalamic acid was prepared by the method disclosed in the copending co-assigned application, Serial No. 51,786, of G. B. Hoey, filed August 25, 1960, now abandoned. Briefly, this involves the partial hydrolysis of the dimethyl ester of 5-nitroisophthalic acid with 1 equivalent of sodium hydroxide, followed by acidification to yield the monomethyl ester. The monomethyl ester is treated with methylamine, forming N-methyl-5-nitroisophthalamic acid, which is reduced by catalytic hydrogenation to the corresponding amino compound. This is then iodinated with iodine monochloride to yield the desired 5-amino-2,4,6-triiodo-N-methylisophthalamic acid.

5 - amino - 2,4,6 - triiodo - N - methylisophthalamic acid (200 g., 0.35 mole) was slurried in dimethylacetamide (420 ml.), and chloroacetyl chloride (65 ml., 0.86 mole) was added with stirring. After 10 minutes additional stirring, solution was complete. After 1½ hours, 40 ml. of water was added. All solvents were then removed by evaporation of a steam bath. The residue was dissolved in 1.5 liters of water with a slight excess of sodium hydroxide, the acidity was adjusted to pH 5 with acetic acid, and the solution was treated with decolorizing charcoal. The filtrate from the charcoal treatment was acidified, with the resultant formation of a gum. The mother liquor was decanted off and the gum redissolved in water (1.5 l.) containing a slight excess of sodium hydroxide. An excess of concentrated hydrochloric acid was then added to precipitate crude 5-chloroacetamido-2,4,6-triiodo-N-methylisophthalamic acid.

EXAMPLE 21

*5-aminoacetamido-2,4,6-triiodo-N-methylisophthalamic acid*

The crude 5-chloroacetamido-2,4,6-triiodo-N-methylisophthalamic acid from Example 20 was dissolved in concentrated ammonium hydroxide (3 liters) and set aside in a closed container for 3 days. The solution was then concentrated to about 900 ml., neutralized to pH 5 with acetic acid, and chilled. The almost colorless product was dissolved in water (700 ml.) containing a slight excess of sodium hydroxide, the solution was filtered and slowly added to hot stirred 40% w./v. acetic acid (100 ml.). The resulting suspension was digested for ½ hour, then chilled. The product was collected, washed with ice water, then alcohol, and dried at 110° C. Yield of 5-aminoacetamido-2,4,6-triiodo-N-methylisophthalamic acid, 76.5 g. Calculated for $C_{11}H_{10}N_3O_4I_3$: Neutral equivalent, 629. Found: Neutral equivalent (after correction for 4.8% water), 620.

EXAMPLE 22

*5-aceturamido-2,4,6-triiodo-N-methylisophthalamic acid*

5 - aminoacetamido - 2,4,6 - triiodo - N - methylisophthalamic acid (70.5 g., 0.108 mole) was dissolved in water (500 ml.) containing 10 g. (0.25 mole) of sodium hydroxide. Acetic anhydride (20 ml., 0.21 mole) was added to the stirred solution, and stirring was continued for 1 hour. The reaction solution was then treated with decolorizing charcoal at room temperature and filtered. The colorless filtrate was slowly added to a stirred mixture of 25 ml. concentrated hydrochloric acid and 50 ml. of water at room temperature. The solution was chilled in a refrigerator and additional hydrochloric acid added until no further separation of product was noted. This amorphous material crystallized on standing overnight in the refrigerator. The product was collected, washed with ice water and dissolved in water (500 ml.) containing sodium hydroxide (6 g.). Acetic acid was added to pH 5 and the solution was filtered and slowly added to a stirred mixture of concentrated hydrochloric acid (20 ml.) and water (30 ml.). The precipitation mixture was placed in the refrigerator for 2 days during which time the product crystallized. It was collected, washed with ice water, and dried at 105° C. Yield of 5-aceturamido-2,4,6-triiodo-N-methylisophthalamic acid, 50 g. (67.5%). Melting point 242–243° C. (corrected), with decomposition. Calculated for $C_{13}H_{12}N_3O_5I_3$: Neutral equivalent, 672; iodine, 56.7%. Found (after correction for 1.1% water): Neutral equivalent, 676; iodine, 56.8%.

EXAMPLE 23

*5-aceturamido-2,4,6-triiodo-N-methylisophthalamic acid, sodium salt*

The sodium salt of 5 - aceturamido - 2,4,6-triiodo-N-methylisophthalamic acid was prepared from the free acid by conventional means. Its solubility in water at 25° C. is greater than 100 g. per 100 ml. of solution.

A 55% (w./v.) solution of this salt, containing 300 mg. I/ml., was prepared. Methylparaben (0.1%) and sodium biphosphate (0.015%) were added and the solution was pasteurized. Using this solution, the intravenous acute $LD_{50}$ of the salt in albino mice was found to be approximately 25,000 mg./kg.

EXAMPLE 24

*5-chloroacetamido-2,4,6-triiodoisophthalamic acid*

5-amino-2,4,6-triiodoisophthalamic acid was prepared by the method disclosed in the copending application of G. B. Hoey, Serial No. 121,388, filed July 3, 1961, now abandoned. Briefly, this involves the following steps. 5-nitroisophthalic acid is converted to its dimethyl ester and one of the ester groups is then selectively hydrolyzed by carefully treating a solution of the diester with one equivalent of a strong base such as sodium or potassium hydroxide. The monoester is treated with ammonium hydroxide to form 5-nitroisophthalamic acid, after which the nitro group is reduced by catalytic hydrogenation. The resulting 5-aminoisophthalamic acid is then exhaustively iodinated with iodine monochloride.

Chloroacetyl chloride (100 ml., 1.3 mole) was added slowly to a stirred suspension of 5-amino-2,4,6-triiodoisophthalamic acid (558 g., 1.0 mole) in 400 ml. of N,N-dimethylacetamide. When the reaction solution had cooled to room temperature 6.5 volumes of water were added and the mixture was digested 1 hour on the steam bath, then chilled. The product which separated was collected and dissolved in water (4 liters) with the aid of sodium hydroxide (66 g.). The solution of the sodium salt was acidified slightly (pH 6) with acetic acid, treated with decolorizing charcoal and filtered. 5-chloroacetamido-2,4,6-triiodoisophthalamic acid was then precipitated by the addition of hydrochloric acid, and the precipitate was collected, washed and dried at 110° C. Yield, 493 g. (76% of theory). Melting point, 311.7–314.7° C. (corrected). Calculated for $C_{10}H_6N_2O_4I_3Cl$: Neutral equivalent, 634.4. Found: Neutral equivalent, 630 (corrected for 2.7% water, determined by Karl Fischer titration).

EXAMPLE 25

*5-aminoacetamido-2,4,6-triiodoisophthalamic acid*

5-chloroacetamido-2,4,6-triiodoisophthalamic acid (493 g., 0.78 mole) was dissolved in concentrated ammonium hydroxide (10 liters), and the container was sealed and set aside for 3 days. The solution was then evaporated to a volume of 1.5 liters and neutralized with acetic acid. This caused the formation of a gel, which was converted to a fine white crystalline product by digestion on a steam bath. The mixture was chilled and the product collected and washed. The crude product was redissolved in water as the sodium salt, the solution was filtered, and the product reprecipitated by the addition of acetic acid. The product was collected, washed and dried at 110° C. Yield of 5-aminoacetamido-2,4,6-triiodoisophthalamic acid, 304 g. (62% of theory). Melting point, 270.6° C. Calculated for $C_{10}H_8N_3O_4I_3$: Neutral equivalent, 615. Found: Neutral equivalent, 628 (corrected for 0.7% water).

EXAMPLE 26

*5-aceturamido-2,4,6-triiodoisophthalamic acid*

5-aminoacetamido-2,4,6-triiodoisophthalamic acid (200 g., 0.325 mole) was dissolved in water (1 liter) containing sodium hydroxide (26 g., 0.65 mole). Acetic anhydride (46 ml., 0.48 mole) was added to this well stirred solution, and after 45 minutes the product was precipitated by the addition of concentrated hydrochloric acid. The precipitation mixture was chilled and the white product collected and washed with water. The crude 5-aceturamido-2,4,6-triiodoisophthalamic acid was purified by twice precipitating the acid from a solution of its sodium salt. The dry product (115 g.) was then digested with absolute alcohol (400 ml.) on a steam bath. The mixture was then chilled and the product collected and dried. Yield of 5-aceturamido-2,4,6-triiodoisophthalamic acid, 107 g. (50% of theory). Melting point 259.7° C. (with decomposition) (corrected). Calculated for $$C_{12}H_{10}N_3O_5I_3$$

Neutral equivalent, 657; iodine, 58.0%. Found (corrected for 1% water): Neutral equivalent, 653; iodine, 57.8%.

EXAMPLE 27

*5-aceturamido-2,4,6-triiodoisophthalamic acid, sodium salt*

The sodium salt of 5-aceturamido-2,4,6-triiodoisophthalamic acid was prepared from the free acid by conventional means. Its solubility in water at 25° C. is approximately 108 g. per 100 ml. of solution.

A 53.5% solution of the sodium salt, containing 300 mg. I/ml., 0.1% methylparaben as a preservative and 0.015% sodium biphosphate as a buffer, was prepared and pasteurized. When tested by a modification of the technique described by Whiteleather and De Saussure (Radiology 67: 537–43, October 1956), the local tissue toxicity of this salt, as indicated by damage to the blood brain barrier of the dog, compared favorably with that of sodium diatrizoate.

EXAMPLE 28

*5-aceturamido-2,4,6-triiodo-N,N-dimethylisophthalamic acid*

5-aceturamido-2,4,6-triiodo-N,N-dimethylisophthalamic acid is prepared by a sequence of reactions similar to that disclosed in Examples 20, 21 and 22, appropriate substitution of starting material being made.

5-amino-2,4,6-triiodo-N,N-dimethylisophthalamic acid is prepared by the method disclosed in the copending, co-assigned application, Serial No. 125,373 of G. B. Hoey, filed July 20, 1961 now abandoned. The dimethyl ester of 5-nitro-isophthalic acid is selectively hydrolyzed to the mono-methyl ester, which is treated with phosphorus pentachloride to form 3-carbomethoxy-5-nitrobenzoyl chloride. This acid chloride is treated in aqueous medium at low temperature with a slight excess of dimethylamine and 2 equivalents of sodium bicarbonate. The resulting N,N-dimethyl-5-nitroisophthalamic acid, methyl ester, is hydrolyzed to the free acid, which is then catalytically hydrogenated to the corresponding 5-amino-N,N-dimethylisophthalamic acid. This acid is iodinated in strongly acid medium, using iodine monochloride as the iodinating agent, to form 5-amino-2,4,6-triiodo-N,N-dimethylisophthalamic acid.

An equivalent quantity of 5-amino-2,4,6-triiodo-N,N-dimethylisophthalamic acid is substituted for the 5-amino-2,4,6-triiodo-N-methylisophthalamic acid provided for in Example 20, and is treated with chloroacetyl chloride under conditions generally similar to those there described to form 5-chloroacetamido-2,4,6-triiodo-N,N-dimethylisophthalamic acid. This compound is isolated and treated with an excess of concentrated ammonium hydroxide under the conditions generally described in Example 21 to form 5-aminoacetamido-2,4,6-triiodo-N,N-dimethyl isophthalamic acid. This compound is acetylated generally as described in Example 22, to form 5-aceturamido-2,4,6-triiodo-N,N-dimethylisophthalamic acid.

The sodium and the N-methylglucamine salts of 5-aceturamido-2,4,6-triiodo - N,N - dimethylisophthalamic acid are highly soluble in water and have a high LD$_{50}$ in laboratory animals.

It will be understood that in addition to the compounds specifically disclosed in the above examples, other compounds within the scope of the invention may be prepared by the same general methods.

In view of the above, it will be seen that the several objects of the invention are achieved and other advantageous results obtained.

As various changes could be made in the above products and methods without departing from the scope of the invention, it is intended that all matter contained in the above description shall be interpreted as illustrative and not in a limiting sense.

What is claimed is:
1. A compound selected from the group represented by the general formula:

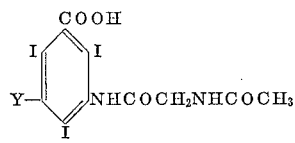

wherein Y is a function known to be compatible with low toxicity and high water solubility in the 2,4,6-triiodobenzoic acid configuration, selected from the group consisting of hydrogen, carboxyl, lower alkanamido, lower alkyl sulfonamido, ureido, 3-lower alkyl ureido, 3,3-bis-(lower alkyl) ureido, lower alkoxy, 2,3-dihydroxypropoxy, carbamyl, N-(lower alkyl) carbamyl, N,N-bis-(lower alkyl) carbamyl and N-(carboxymethyl) carbamyl functions; and the salts thereof with pharmaceutically acceptable cations.

2. 3-aceturamido-2,4,6-triiodobenzoic acid.
3. 3 - acetamido - 5 - aceturamido-2,4,6-triiodobenzoic acid.
4. 5-aceturamido-2,4,6-triiodo-N-methylisophthalamic acid.
5. 5-aceturamido-2,4,6-triiodoisophthalamic acid.
6. 5-aceturamido-2,4,6-triiodoisophthalamic acid, sodium salt.

References Cited by the Examiner
UNITED STATES PATENTS

| | | | |
|---|---|---|---|
| 2,708,678 | 5/55 | Papa | 260—501 |
| 2,776,241 | 1/57 | Priewe | 260—501 |
| 2,820,814 | 1/58 | Ginsberg | 260—518 |
| 3,004,964 | 10/61 | Wiegert | 260—518 |

FOREIGN PATENTS 1,006,428   4/57   Germany.

OTHER REFERENCES

Priewe: German application Serial No. Sch 17,255, printed September 20, 1958, 2 pp.

Migrdichian: Organic Synthesis, 1957, pp. 465–468.

LORRAINE A. WEINBERGER, *Primary Examiner.*

LEON ZITVER, *Examiner.*